(12) United States Patent
Parulski

(10) Patent No.: US 7,587,337 B1
(45) Date of Patent: Sep. 8, 2009

(54) LEASING CONFIGURED CAMERA SYSTEM

(75) Inventor: Kenneth A. Parulski, Rochester, NY (US)

(73) Assignee: Eastman Kodak Company, Rochester, NJ (US)

( * ) Notice: Subject to any disclaimer, the term of this patent is extended or adjusted under 35 U.S.C. 154(b) by 1826 days.

(21) Appl. No.: 09/534,471

(22) Filed: Mar. 24, 2000

(51) Int. Cl.
G06Q 30/00 (2006.01)

(52) U.S. Cl. .......................... 705/26; 705/27; 396/310; 396/311; 396/319; 396/321

(58) Field of Classification Search .................. 396/310, 396/311, 319, 321; 705/26, 27
See application file for complete search history.

(56) References Cited

U.S. PATENT DOCUMENTS

| | | | |
|---|---|---|---|
| 5,477,264 A | 12/1995 | Sarbadhikari et al. | |
| 5,606,385 A | 2/1997 | Siekierski | |
| 5,758,216 A | 5/1998 | Arnold | |
| 5,819,126 A * | 10/1998 | Kitagawa et al. | ............ 396/319 |
| 5,894,571 A | 4/1999 | O'Connor | |
| 5,914,748 A | 6/1999 | Parulski et al. | |
| 5,960,411 A | 9/1999 | Hartman et al. | |
| 5,963,743 A | 10/1999 | Amberg et al. | |
| 5,991,543 A | 11/1999 | Amberg et al. | |
| 5,995,757 A | 11/1999 | Amberg et al. | |
| 6,047,140 A * | 4/2000 | Yoshikawa | ............... 396/311 X |
| 6,147,744 A * | 11/2000 | Smart et al. | ............. 396/311 X |

\* cited by examiner

*Primary Examiner*—F. Zeender
*Assistant Examiner*—Luna Champagne
(74) *Attorney, Agent, or Firm*—Pamela R. Crocker; Frank Pincelli; Stephen H. Shaw

(57) ABSTRACT

A method for a customer leasing a configured camera system including a camera and services for using such configured camera system and paying for the lease of such configured camera system, includes the steps of providing an electronic database of information describing a plurality of differently configured camera systems which have different features and services that can be selected by the customer via a digital communications network; displaying at the customer's location remote from the electronic database various components of the camera system that can be combined into the configured camera system; the customer selecting desired components and services to provide the configured camera system and completing a lease agreement and providing a payment identifier specifying an account to be debited to pay for the configured camera system; and sending the camera to a designee of the customer and establishing a service user account that specify the selected services that the designee can use.

8 Claims, 11 Drawing Sheets

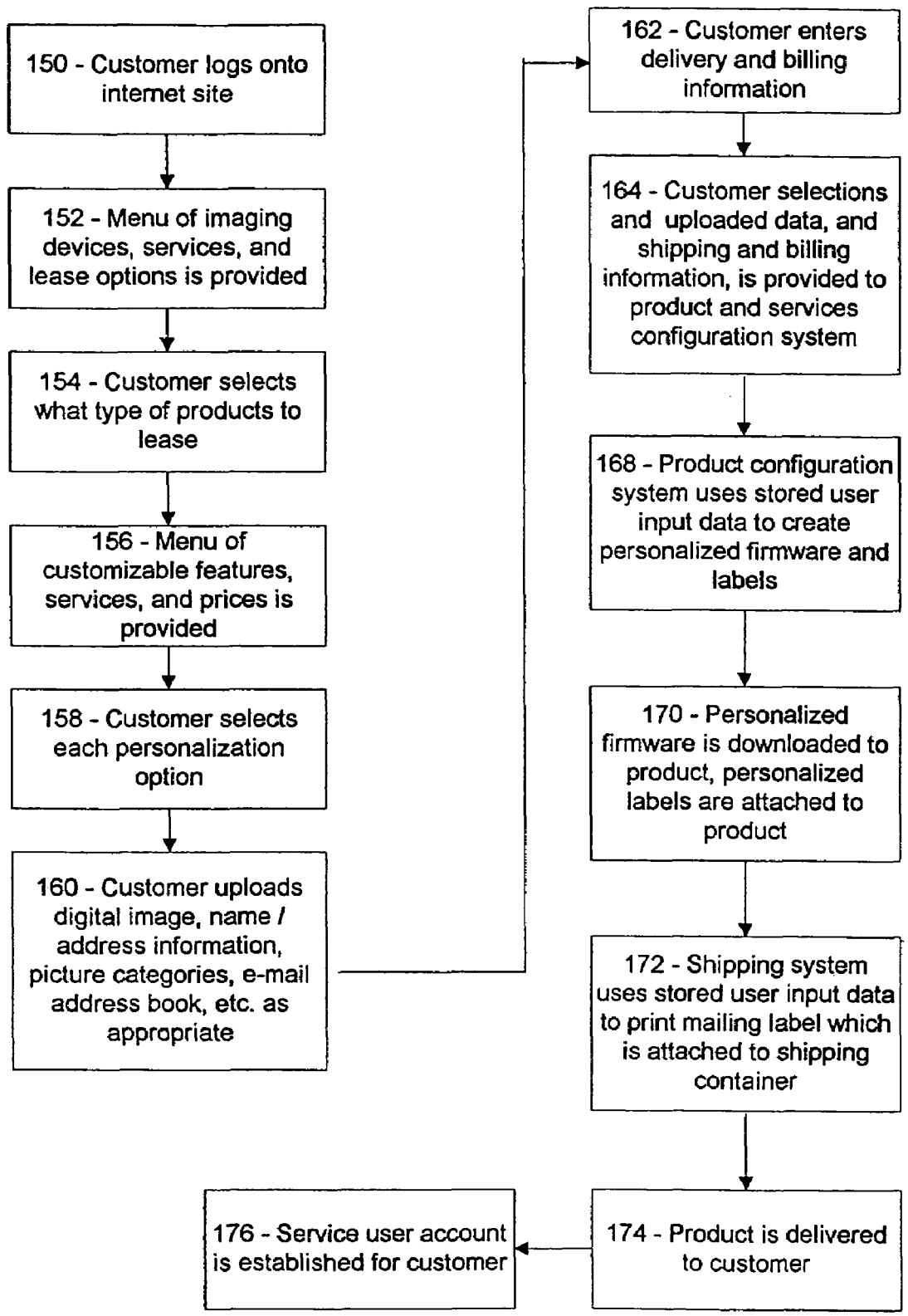
Figure 11 - Lease Transaction Flow Diagram

LEASING CONFIGURED CAMERA SYSTEM

CROSS REFERENCE TO RELATED APPLICATIONS

Reference is made to commonly-assigned U.S. patent application Ser. No. 09/534,469, filed concurrently herewith, entitled "Configuring and Purchasing Imaging Devices" to Parulski, commonly-assigned U.S. patent application Ser. No. 09/534,470, filed concurrently herewith, entitled "Purchasing Configured Photographic Film Products" to Parulski, and commonly-assigned U.S. Provisional Patent Application Ser. No. 60/137,078, filed Jun. 2, 1999 entitled "Method and Apparatus for Providing a User Customizable Digital Camera" to Girish Prabhu et al.

FIELD OF THE INVENTION

The present invention relates to leasing specially configured camera systems and, more particularly, to using the Internet or other electronic network for such leasing of configured camera systems.

BACKGROUND OF THE INVENTION

Digital cameras, film cameras, printers, and other imaging devices can be purchased in stores or over the Internet from the Eastman Kodak Company at kodak.com or other web sites. The web site may provide text, pictures, and even animated graphics describing and comparing various product models. However, the same standard product, defined by the stock keeping unit (SKU), is shipped to everyone who decides to buy that particular product.

Some products (such as golf shirts) that can be ordered over the Internet, or via phone or the U.S. mail service, can be ordered in a particular color with a personalized monogram or name. In this case, the letters of the monogram/name are sent to the location where the shirt is personalized, where the letters are manually loaded into a sewing machine that physically stitches the monogram into the shirt.

U.S. Pat. No. 5,960,411 discloses an arrangement for ordering merchandise over the Internet. Computers can also be ordered over the Internet. See, for example, the Dell computer Internet site. Using this site, different configurations of a Dell computer can be purchased. The customer can buy a "standard" configuration of a particular model computer, or can instead select (using pull-down menus) various options. A "learn more" link next to each option enables the user to understand the differences between these options in order to select the most appropriate option. Prior art patents related to customizing computer systems include U.S. Pat. No. 5,894,571, U.S. Pat. No. 5,995,757 and U.S. Pat. No. 5,991,543, and U.S. Pat. No. 5,963,743. These patents relate to ordering selected equipment over the Internet, but the equipment that is produced is defined entirely by the user selections from pre-existing menus. The user does not upload personal data or digital images that are used to personalize the computers or other merchandise.

A digital camera system, described in commonly-assigned U.S. Patent Application Ser. No. 60/137,078, filed Jun. 2, 1999 entitled "Method and Apparatus for Providing a User Customizable Digital Camera", the disclosure of which is herein incorporated by reference, includes the ability to download, from the Internet, special software components that can be used to "upgrade" a camera to provide personalized capabilities, or to personalize a camera in a retail store as the camera is sold.

The ability to customize a camera after purchase using a memory card (for example, by providing a template background into which an image is placed) is described in commonly-assigned U.S. Pat. No. 5,477,264 to Sarbadhikari et al., the disclosure of which is herein incorporated by reference.

The ability to provide camera defect data from a camera manufacturing site over a network to an interactive control node which corrects images provided by a digital camera is described in U.S. Pat. No. 5,606,385, to Maurinus et al.

Commonly-assigned U.S. Pat. No. 5,758,216 to Arnold, the disclosure of which is herein incorporated by reference, describes a single use camera having pre-exposed latent images of symbols that are combined with captured images.

On a web page found at the web site for bestcameras a user can order single-use cameras in a variety of cover designs. The user can call a phone number posted at the web site and have a template mailed to the user in Adobe Illustrator format. The user can modify the design in the template and mail back the file, where it can be printed and attached to the outside case of a single use camera. The user can also order single use cameras on-line. The user can choose between several printed paper cover style options, and can personalize the cover with a text message imprinted using the color of text that he or she selects.

The camera company web site enables a user to order customized single use cameras. The customer mails the company logo, photographs, or other literature to the company, which designs a camera for the customer, having a customized printed paper cover for a group of cameras.

SUMMARY OF THE INVENTION

It is an object of the present invention to lease a configured camera system including a camera and services for using such configured camera system, and paying for such lease.

This object is achieved by a method for a customer leasing a configured camera system including a camera and services for using such configured camera system and paying for the lease of such configured camera system, comprising the steps of:

(a) providing an electronic database of information describing a plurality of differently configured camera systems which have different features and services that can be selected by the customer via a digital communications network;

(b) displaying at the customer's location remote from the electronic database various components of the camera system that can be combined into the configured camera system;

(c) the customer selecting desired components and services to provide the configured camera system and completing a lease agreement and providing a payment identifier specifying an account to be debited to pay for the configured camera system; and (d) sending the camera to a designee of the customer and establishing a service user account that specify the selected services that the designee can use.

ADVANTAGES

It is an advantage of the present invention for a customer to lease a configured camera system and to pay for such lease.

It is an another advantage of the present invention that the functionality of different features can be viewed by a customer and readily configured into a camera using an electronic network.

BRIEF DESCRIPTION OF THE DRAWINGS

FIG. 7b depicts a rear perspective view of the film camera of 7a;

FIG. 9 is a block diagram of apparatus used to personalize the one-time use film camera depicted in FIG. 7;

FIG. 11 is a flow diagram of a typical lease transaction for providing personalized digital imaging products and services.

DETAILED DESCRIPTION OF THE INVENTION

In accordance with the present invention, a method is described for configuring cameras or other imaging devices. A customer, such as a purchaser or lessor, selects various camera features, provided by corresponding software programs. The software programs can be, for example, various firmware modules executed by a processor that controls the imaging device. The customer provides a payment identifier, such as a credit card or debit card number, specifying an account to be debited to pay for the camera. A camera configured to include the features selected by the customer, provided by the corresponding software programs, is then sent to a designee of the customer. The customer's designee can, of course, be the customer.

In accordance with another embodiment of the present invention, a customer selects various camera features and imaging services. Such services can include storing digital image files from the selected camera on-line, or producing digital prints or digital storage products (e.g., CD-R discs) from digital images from the selected camera. The customer completes a lease agreement and provides a payment identifier. A camera configured to include the features selected by the customer is then sent to a designee of the customer, and a service account is established to specify the selected services that the designee is entitled to use.

In accordance with another embodiment of the present invention, the customer also provides personal digital data identifying the designee. This personal digital data can include ASCII text providing the designee's name, mailing address, phone number, or e-mail address, and a digital image of the designee. This digital data is then stored in the digital imaging device and can be displayed to determine the owner, in case the digital imaging device is lost or stolen.

In accordance with another embodiment of the present invention, the customer orders a lot of one-time use (OTU) cameras or a lot of film rolls, for a particular event with which the customer is associated. The lot can, for example, include several thousand film rolls for an event such as the Rose Bowl parade or a few dozen OTU cameras for an event such as an anniversary party. The customer provides one or more digital images, which are then pre-exposed onto the first film frame(s) of the film in the OTU cameras, or the film rolls. The customer can also provide images, graphics, or text messages which are included on a label attached to the OTU camera.

Figure 1:
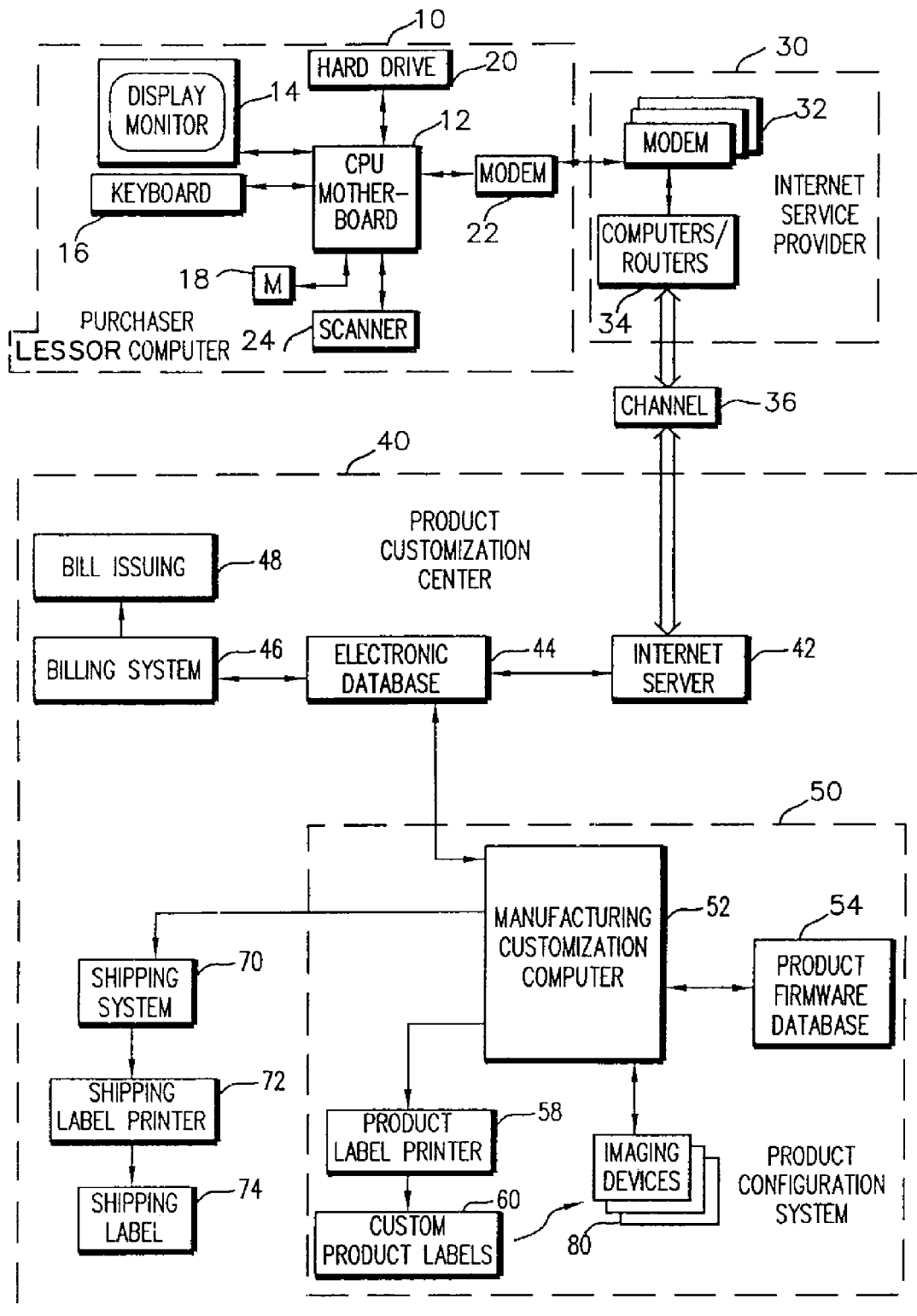
FIG. 1 depicts a block diagram of a system that implements this invention.

As shown in FIG. 1, the system includes a computer (and associated peripherals) 10 located at the customer, such as the purchaser or lessor's location (e.g., their home). The system also includes a network service provider, such as Internet service provider (ISP) equipment 30 located at the ISP's location, which communicates with the computer 10 to provide a network connection for the purchaser/lessor to a channel 36, such as the Internet. The system further includes a product customization center 40 which communicates with the computer 10 via the channel 36 and the ISP 30 to perform the steps of selecting, configuring, purchasing, billing, and shipping a customized imaging device 80. The product customization center 40 includes an electronic database 44, which is located remote from the computer 10.

The products to be customized (e.g., the digital cameras to be customized) can be manufactured or assembled at the product customization center 40. Alternatively, they can be manufactured at a different location, and shipped to the product customization center 40 where they are customized. The various portions of the product customization center 40 can be located in a single building or complex of adjacent buildings, or can be geographically disbursed over several sites in different cities or even different continents. For example, the electronic database 44 and a manufacturing customization computer 52 can be located in different cities and interconnected via a suitable digital communications network, such as the Internet. Furthermore, the electronic database 44 can itself be distributed over several computers in several different locations.

The computer 10, which can be, for example, a Dell Dimension XPS M200, includes a CPU motherboard 12, using, for example, a Pentium 200 MHz MMX processor as well as RAM memory. The CPU motherboard 12 executes software stored on a hard drive 20, for example, the well-known Windows 98 operating system software and the Internet Explorer web browser software, both provided by Microsoft Corp. of Redmond, Wash. The CPU motherboard 12 is directly coupled to a display monitor 14 and a keyboard 16. A mouse 18 permits the customer to readily communicate with the CPU motherboard 12. The CPU motherboard 12 communicates with a color scanner 24, such as a Microtek ScanMaker E6, which can scan a photograph, for example, a picture of the customer or the designee of the customer, and store the digital image of the photograph on the hard drive 20. The customer's computer 10 also includes a dial-in modem 22 for communicating with the ISP 30 in order to connect to a channel 36, such as the Internet.

The ISP 30, for example, Earthlink Network, Inc. of Pasadena, Calif., includes banks of modems 32, one of which is connected to communicate with the modem 22 of the customer's computer 10. The modem 32 in turn communicates with computers/routers 34 in order to provide a connection to the channel 36 using equipment and techniques well known to those skilled in the art.

The product customization center 40 is connected to the channel 36, such as the Internet, by a network server, such as Internet server 42, which is comprised of one or more computers and associated peripherals. The electronic database 44 provides information describing numerous imaging devices 80, such as digital cameras, APS film cameras, digital printers, image display devices, and the like. The electronic database 44 includes information describing different features of these devices that can be selected and customized by the customer using the customer's computer 10.

The electronic database 44 further includes software programs, for example, JAVA applets, MPEG or QuickTime movies, or Shockwave files, which depict the functionality of features that the customer can choose. The software programs may demonstrate features, such as in-camera red-eye removal using images provided as part of the electronic database 44. In this case, the program shows a "before processing" picture having red-eye, and an "after processing" picture which has been processed to remove red-eye. Alternatively, the software program may demonstrate features using customer supplied images, such as images provided using the scanner 24. In this case, the user can observe the effects of the feature, such as red-eye removal, using their personal images in order to better judge the value of a particular feature. The "before" picture is supplied by the user, and the "after" picture is processed using software supplied by the electronic database 44. This software can process the image on the user's host computer 12 by using, for example, a JAVA applet. Alternatively, the user's image may be transferred via the ISP 30 and the channel 36 to the Internet Server 42 and processed. The "after processing" image can then be transferred from the Internet Server 42 to the user's computer 10 for viewing on the display monitor 14.

The electronic database 44 can be contained on the same computer as the Internet server 42, or can utilize a separate computer, or can be distributed over several computers at the same physical site, or at different sites.

When a customized imaging device 80 is purchased, the electronic database 44 communicates with a billing system 46 to verify that the payment identifier (e.g., credit card or debit card number) provided by the customer is valid, and to debit the account for the purchase. The customer's account that is debited can, of course, be located at a remote financial institution. Typically, as with credit cards, this financial institution will make payment to the direct provider or seller of the imaging device 80. This is generally done by wiring the amount into the direct provider's account, generally an account established with another financial institution.

As shown in FIG. 1, the electronic database 44 is connected to a manufacturing customization computer 52 that forms part of a product configuration system 50. The product configuration system 50 provides and downloads software programs, such as customized firmware modules, to the imaging devices 80 in order to configure the imaging devices 80 to provide the customer selected features. The firmware downloaded to a particular digital imaging device 80 includes firmware selected from a product firmware database 54 in response to purchaser/lessor selections, and personal digital data provided by the customer, such as name and address information, or a digital picture. The manufacturing customization computer 52 is also connected to a product label printer 58 which produces custom product labels 60 which can be affixed to the imaging devices 80.

The manufacturing customization computer 52 also communicates with a shipping system 70 that controls a shipping label printer 72 to produce a shipping label 74. The shipping label 74 is attached to a shipping container (e.g., a cardboard box) that contains and protects the properly configured imaging device 80 during shipment (e.g., via air express mail, ground carrier, etc.) to the customer's designee.

Figure 2:
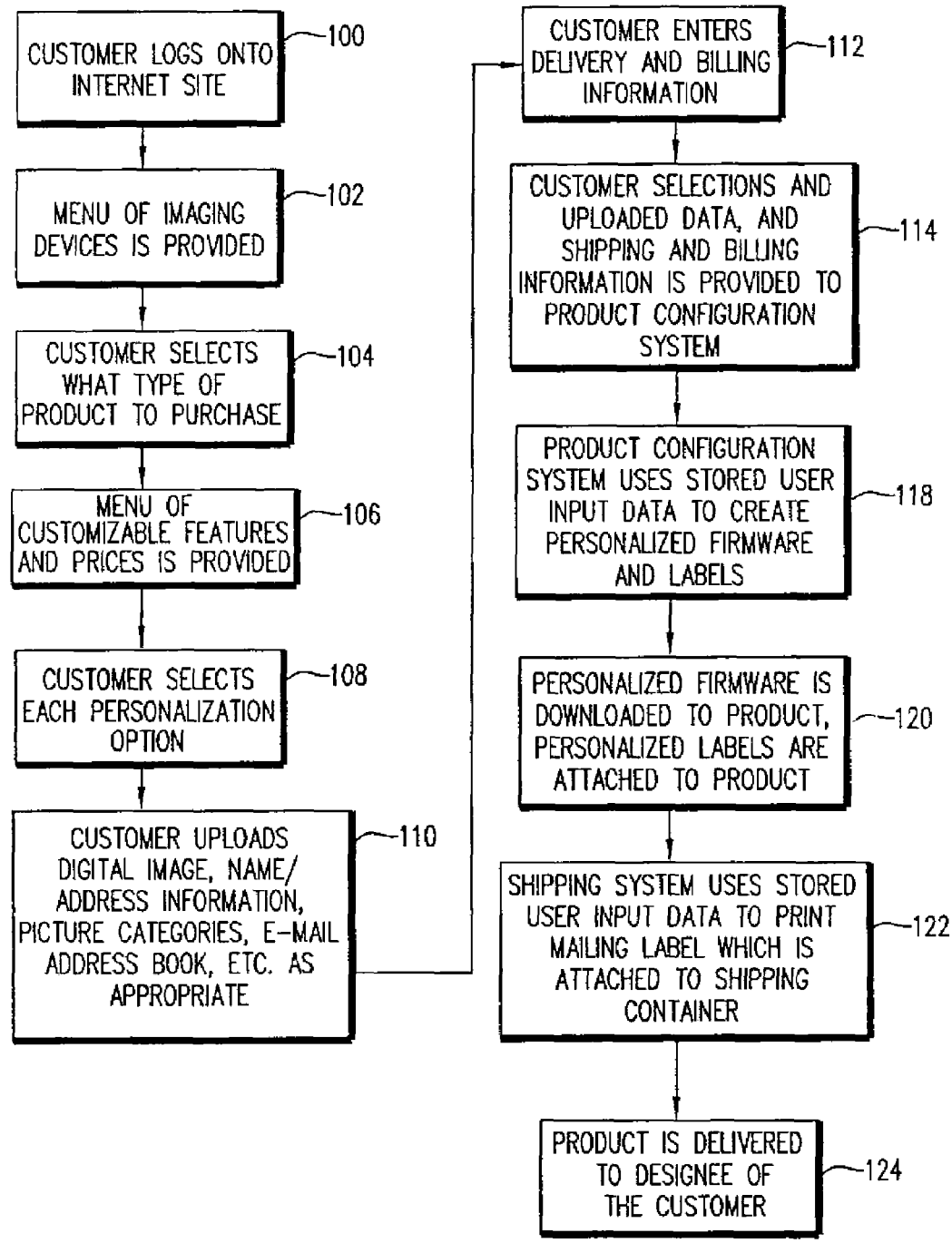
FIG. 2 is a flow diagram of a typical purchase transaction for providing personalized digital imaging products.

Turning now to FIG. 2, there is shown a flow diagram of a typical purchase transaction for providing personalized digital imaging products. As shown in block 100, the customer, using a digital communication network, logs onto the channel 36, which can be the Internet. The customer can, of course, use a service provider, such as the ISP 30, to gain access to the channel 36. The ISP 30 uses an address, such as an Internet protocol (IP) address, to establish a connection between the customer's computer 10 and a product provider or seller which owns or controls the product customization center 40.

Figure 3:
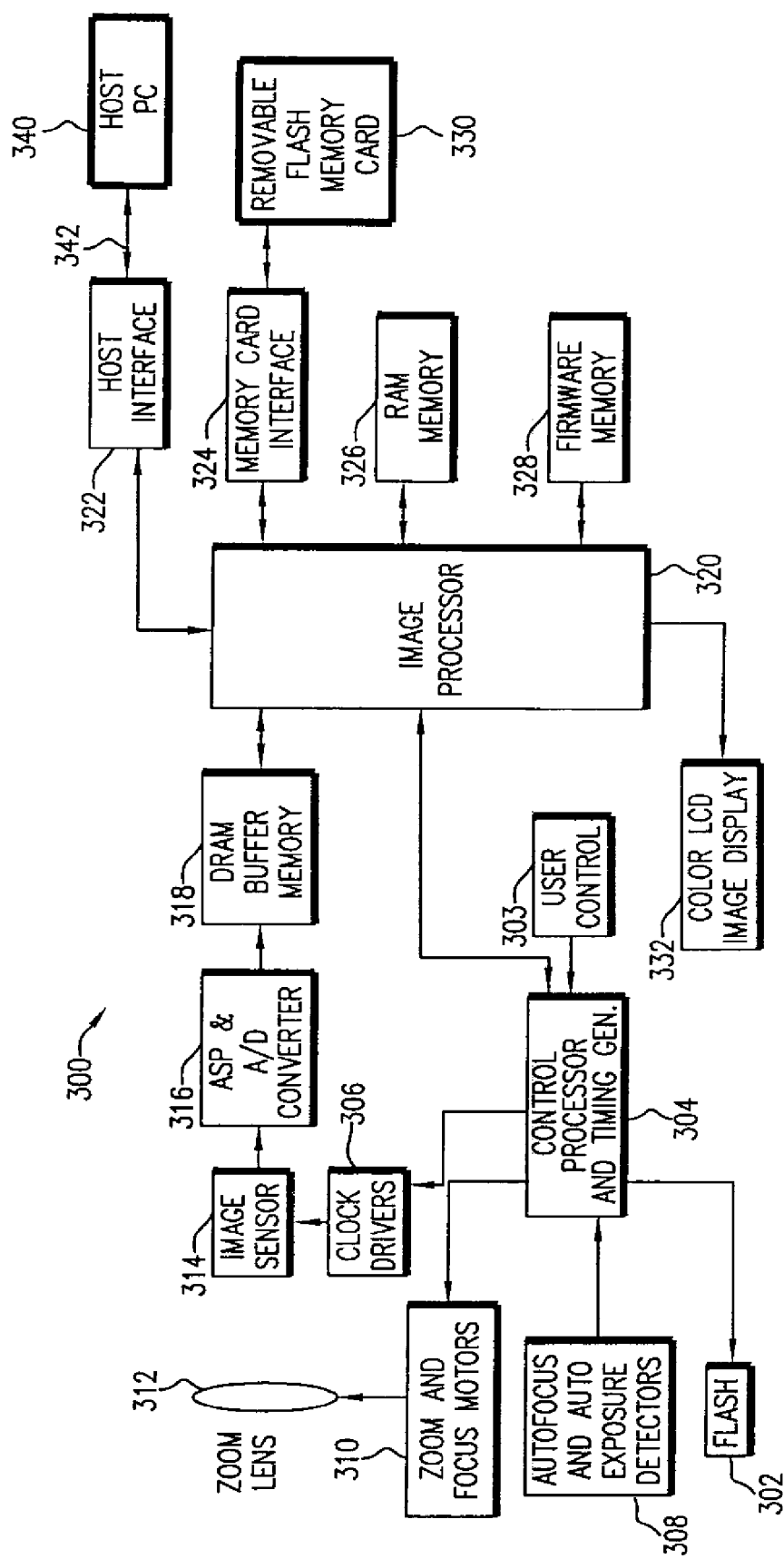
FIG. 3 is a block diagram of an electronic still camera that can be personalized as part of the purchase transaction.
Figure 4:
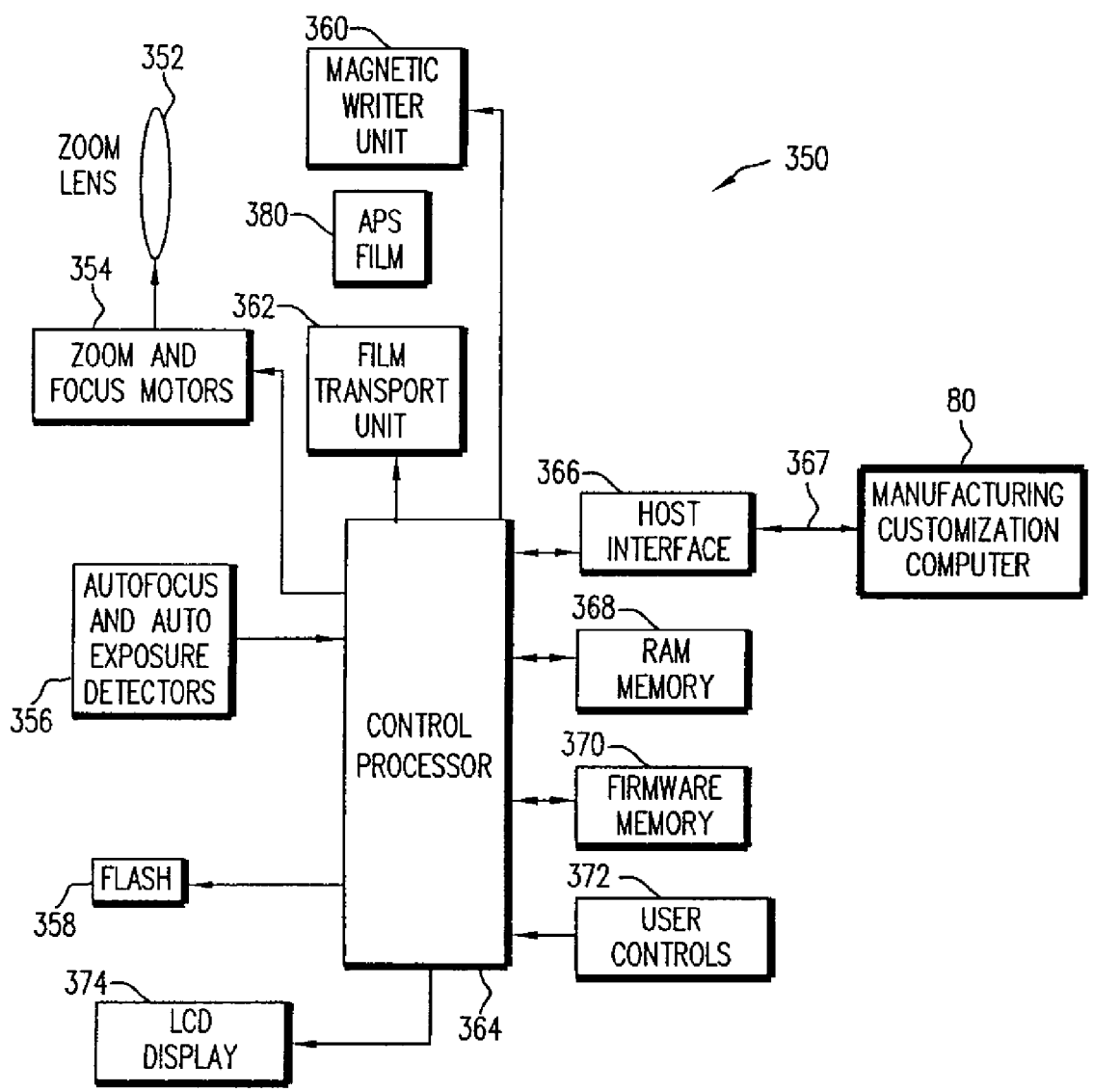
FIG. 4 is a block diagram of an APS film camera that can be personalized as part of the purchase transaction.
Figure 5:
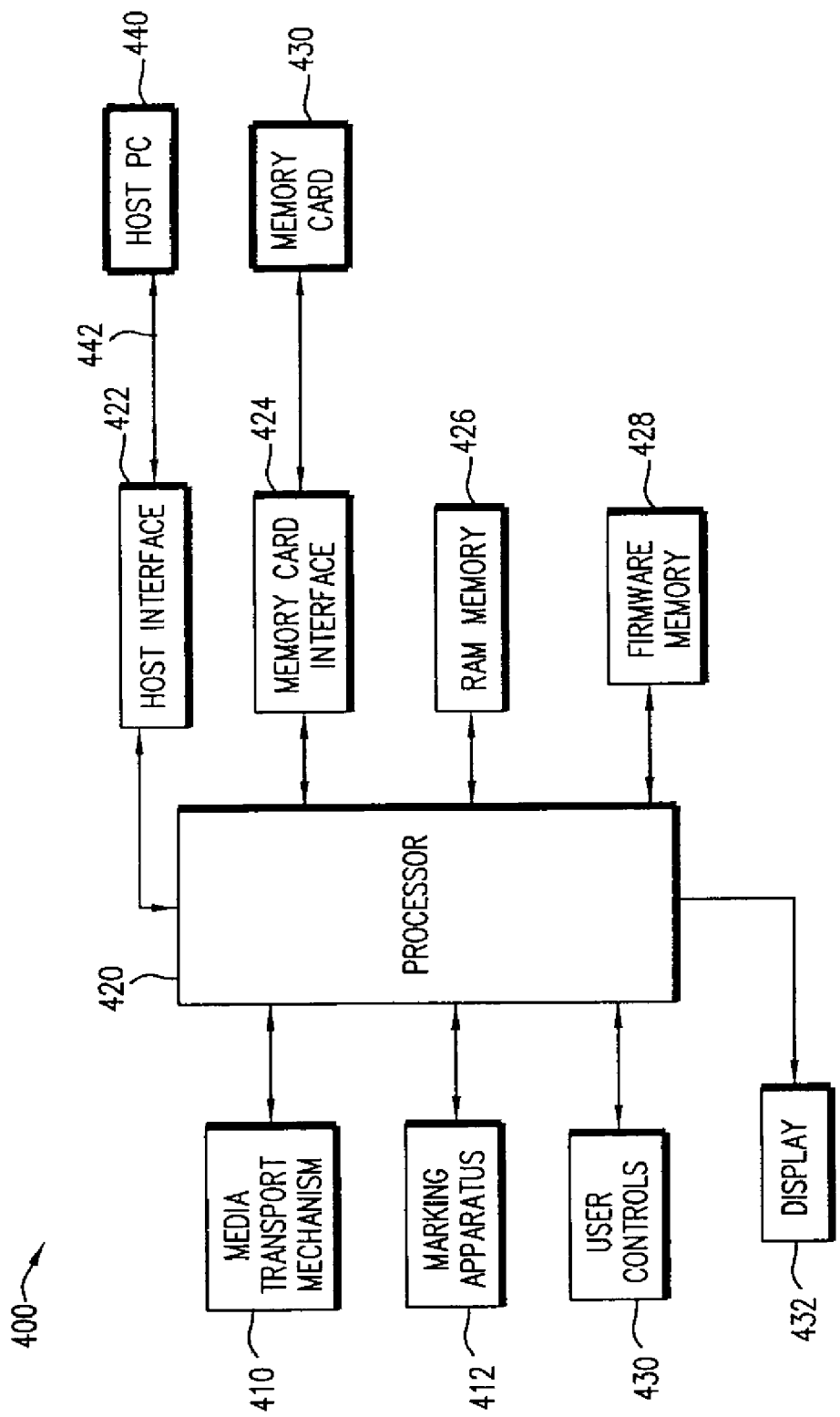
FIG. 5 is a block diagram of a digital printer that can be personalized as part of the purchase transaction.
Figure 6:
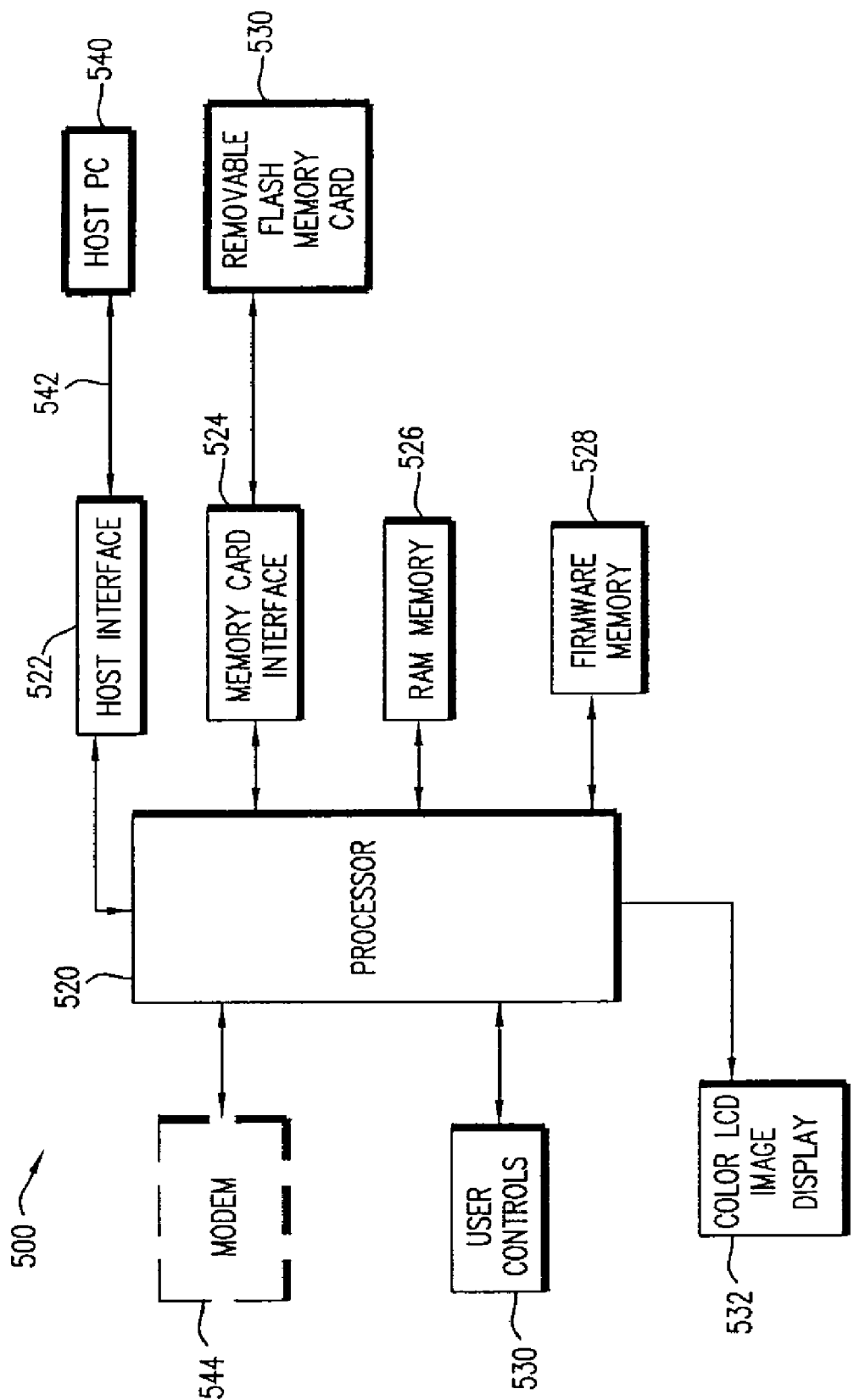
FIG. 6 is a block diagram of a digital image display device that can be personalized as part of the purchase transaction.

In block 102, the product provider provides the customer with a menu of imaging devices 80 that are available for configuration, such as an electronic camera 300 depicted in FIG. 3, a film camera 350 depicted in FIG. 4, a digital printer 400 depicted in FIG. 5, and a digital image display device 500 depicted in FIG. 6.

In block 104, the customer selects a desired type of imaging device 80 to be purchased, for example, the electronic camera 300. At that point, in block 106, a menu of customizable features that can be selected, and corresponding prices, is presented to the customer. In block 108, the customer customizes the features of the desired electronic camera 300 so as to select a desired configuration for the electronic camera 300.

The features from which the customer can select may include features such as:

Configuring the electronic camera 300 to provide different types of color images, such as monochrome, sepia, false-color, or super saturated color images or special effects filters (e.g., a digital star filter effect);

Configuring the electronic camera 300 to support various image resolution or compression levels, compression algorithms, or image file formats;

Configuring the electronic camera 300 to provide the ability to modify captured images as they are processed, such as by digital zooming and cropping, tone or color adjustments, or sharpness adjustments;

Configuring the electronic camera 300 to provide red-eye removal as described in commonly-assigned U.S. patent application Ser. No. 09/290,290, filed Apr. 13, 1999 to Fredlund, the disclosure of which is herein incorporated by reference;

Configuring the electronic camera 300 to provide the ability to select one or more border templates that may be combined with newly captured digital images, as described in commonly-assigned U.S. Pat. No. 5,477,264 to Sarbadhikari et al., the disclosure of which is herein incorporated by reference;

Configuring the electronic camera 300 to group images into various categories or folders, as described in commonly-assigned U.S. Pat. No. 5,633,678, the disclosure of which is herein incorporated by reference;

Configuring the electronic camera 300 to provide print ordering from the camera, as described in commonly-assigned U.S. patent application Ser. No. 08/977,382, filed Nov. 24, 1997 to Parulski, the disclosure of which is herein incorporated by reference;

Configuring the electronic camera 300 to provide the ability to stitch multiple images together to produce panoramic images, such as by using the method described in commonly-assigned U.S. patent application Ser. No. 09/224,547, filed Dec. 31, 1998 to Parulski, the disclosure of which is herein incorporated by reference;

Configuring the electronic camera 300 to make selected sounds, such as making funny noises as pictures are taken or as various user controls 303 are depressed. One or more sound files can be selected from a group of sound files provided as part of the customization software. For example, one particular sound file can be played each time the capture button is depressed to take a picture, and a different sound file can be played each time a user interface button is depressed when reviewing captured pictures;

Configuring the electronic camera 300 to include "slide show" capability for automatically reviewing the image on color LCD image display 332 for a selected period (e.g., five seconds per image) including selected "transition" effects (e.g., fades or pulls) from one image to the next;

Configuring the electronic camera 300 to upload, from the user's computer 10 to the electronic camera 300, particularly memorable personal images which are stored within firmware memory 328 to enable viewing by others via the color image display 332;

Configuring the electronic camera 300 to composite multiple images together, for example, using the method and apparatus described in commonly-assigned U.S. Pat. No. 5,914,748 to Parulski, the disclosure of which is herein incorporated by reference;

Configuring the electronic camera 300 to create html files to produce web pages in the electronic camera, or to provide the ability to e-mail images from the electronic camera, for example, as described in commonly-assigned U.S. patent application Ser. No. 09/004,046, filed Jan. 7, 1998 to Ward, the disclosure of which is herein incorporated by reference;

Configuring the electronic camera 300 to store personal digital data, such as the name, address, and a digital image of the camera owner, in an area of firmware memory 328 (shown in FIG. 3) that cannot be modified by the customer. This information can be displayed on an image display 332 (shown in FIG. 3), such as a color liquid crystal display (LCD), for a specified period (e.g., five seconds) when the electronic camera 300 is turned on. Alternatively, it can be displayed when the appropriate "camera owner information" mode is selected using user controls 303 in conjunction with a graphical user interface (GUI) displayed on the image display 332; and Configuring the electronic camera 300 to include custom labels attached to the camera body providing favorite colors, special messages, or images (such as a picture of the customer's designee, or a favorite logo or cartoon character).

Depending on the features selected, the customer provides appropriate personalization information that will later be incorporated into the configured electronic camera 300 (block 110 of FIG. 2). Such personalization information can include personal digital data, for example, ASCII text providing the name, mailing address, phone number, or e-mail address of the customer's designee, or a digital image of the customer's designee input using the scanner 24 (shown in FIG. 1) or other forms of digital image input, such as a PictureCD. The personalization information can also include names of people or events to be used to categorize images, an address book of e-mail addresses, preferred colors and styles for graphic user interface (GUI) screens, and preferred menu orderings for selected features, to be displayed on the color LCD image display 332 (shown in FIG. 3). The personalization information can also include one or more border templates selected by the customer. The personalization information can also be a message from the customer to the customer's designee. For example, if the purchase is intended as a birthday gift, the personalization information may be the message "Happy $40^{th}$ Birthday John, from Sue". This message could be displayed for a few seconds each time the imaging device 80 is turned on. The personalization information can also include the preferred colors, messages, logos, or images for custom product labels 60.

Depending on the variety of features supported, different versions of electronic camera 300 can be configured by the product configuration system 50. The different versions can, for example, include different amounts of the firmware memory 328 or use a different capability image processor 320, depending on the type or quantity of features selected by the customer. The appropriate version of electronic camera 300 is determined by the manufacturing customization computer 52 as part of the process of customizing the imaging device 80.

In block 112 of FIG. 2, the customer enters delivery and billing information. This information identifies the customer and the customer's designee. It includes addresses of both the customer and the customer's designee. The customer also identifies an account to be debited to pay for the configured electronic camera 300. Often this will be a credit card having a payment identifier that specifies the account of the customer to be charged or debited. Frequently, this will be in a financial institution. The payment identifier can be a credit card number that specifies a particular credit card account. As used in this specification, a credit card will also include a debit card.

After the product provider or seller verifies the customer's account and the availability of the selected imaging device 80, the customer is provided with an electronic agreement form specifying payment and other items such as warranties. If acceptable, the customer typically accepts the agreement by clicking a response box on the graphical user interface of the computer 10. At this point, the financial institution having the customer's account indicates to the product provider or seller that funds are available and designates such funds for transfer to the product provider or seller. If funds are not available, the customer is so advised and may have to use a different payment identifier.

In block 114, the electronic database 44 provides the product configuration center 50 with the customer's selected configuration, and the personalization information. This can occur immediately after the customer accepts the agreement, or at some later time if there is a backlog of products to be configured and shipped for other customers, or if the particular product to be purchased is on backorder and not immediately available for customization.

In block 118, the manufacturing customization computer 52 shown in FIG. 1 provides the particular software programs required to provide the features selected by the customer for the customer's selected imaging device 80. The manufacturing customization computer 52 obtains the required software, either in the form of compiled firmware modules or source code routines, from the product firmware database 54, and incorporates the personal digital data provided by the customer, to configure the personalized firmware for the imaging device 80. This personalized firmware provides the features selected by the customer in block 108 of FIG. 2 and includes the personalized digital data, such as a digital image of the customer's designee, uploaded by the customer in block 110. If the product firmware database 54 includes camera source code, the source code is compiled to produce firmware capable of being executed by image processor 320, before being downloaded to the electronic camera 300.

In block 120, the manufacturing customization computer 52 downloads the configured firmware from block 118 to the imaging device 80 in order to provide a configured imaging device 80, such as the configured electronic camera 300. The firmware can be downloaded to the imaging device 80 using an cable interface, such as interface cable 342 shown in FIG. 3, which connects between a host interface 322 in the electronic camera 300 and a host computer 340, which in this situation is the manufacturing customization computer 52. The firmware can, alternatively, be downloaded to the imaging device 80 using a removable memory, such as a removable flash memory card 330 shown in FIG. 3, which connects to a memory card interface 324 in the electronic camera 300. These techniques for downloading firmware to an imaging device are further described in commonly-assigned U.S. Pat. No. 5,477,264 to Sarbadhikari et al., the disclosure of which is herein incorporated by reference.

As shown in FIG. 1, the manufacturing customization computer 52 also controls the product label printer 58 in order to produce the custom product labels 60. These labels 60 are then attached, for example, by glue or another lamination process, to the configured imaging device 80. The custom product labels 60 are provided in the color scheme selected by the customer in block 110, and include any special messages, logos, or images (such as a picture of the customer's designee, or a favorite logo or cartoon character) provided by the customer.

In block 122, the shipping system 70, which communicates with the manufacturing customization computer 52, controls the shipping label printer 72 to produce the shipping label 74. As previously described with respect to FIG. 1, the configured electronic camera 300 or other imaging device 80 is placed in a shipping container (not shown), and the shipping label 74 is attached to the shipping container.

In block 124, the configured electronic camera 300 or other imaging device 80 is delivered to the customer or the customer's designee. The term "delivery" means that the configured electronic camera 300 can be shipped to the customer or the customer's designee by the U.S. Postal Service (USPS) or by a carrier service, such as the United Parcel Service (UPS) or Federal Express. Alternatively, the configured electronic camera 300 can be delivered to a location such as a store where it can be picked up.

FIG. 3 is a block diagram showing the electronic camera 300 in more detail, which is a first type of imaging device 80 that can be personalized by the product configuration system 50 depicted in FIG. 1. The electronic camera 300 produces digital images that are stored on the removable memory card 330. The electronic camera 300 includes a zoom lens 312 having zoom and focus motor drives 310 and an adjustable aperture and shutter (not shown). The zoom lens 312 focuses light from a scene (not shown) on an image sensor 314, for example, a single-chip color CCD image sensor, using the well-known Bayer color filter pattern. The image sensor 314 is controlled by clock drivers 306. The zoom and focus motors 310 and the clock drivers 306 are controlled by control signals supplied by a control processor and timing generator circuit 304. The control processor and timing generator 304 receives inputs from autofocus and autoexposure detectors 308 and controls a flash 302. The analog output signal from the image sensor 314 is amplified and converted to digital data by the analog signal processing (ASP) and analog-to-digital (A/D) converter circuit 316. The digital data is stored in a DRAM buffer memory 318 and subsequently processed by a processor 320 controlled by the firmware stored in the firmware memory 328, which can be flash EPROM memory.

The processed digital image file is provided to a memory card interface 324 which stores the digital image file on the removable memory card 330. Removable memory cards 330 are known to those skilled in the art. For example, the removable memory card 330 can include memory cards adapted to the PCMCIA card interface standard, as described in the *PC Card Standard, Release* 2.0, published by the Personal Computer Memory Card International Association, Sunnyvale, Calif., September 1991. The removable memory card 330 can also be adapted to the Compact Flash interface standard, such as described in the *CompactFlash Specification Version* 1.3, published by the CompactFlash Association, Palo Alto, Calif., Aug. 5, 1998. Other types of digital memory devices, such as magnetic hard drives, magnetic tape, or optical disks, could alternatively be used to store the digital images.

The processor 320 performs color interpolation followed by color and tone correction, in order to produce rendered sRGB image data. The rendered sRGB image data is then JPEG compressed and stored as a JPEG image file on the removable memory card 330. The processor 320 also creates a "thumbnail" size image that is stored in RAM memory 326 and supplied to the color LCD image display 332, which displays the captured image for the user to review. The electronic camera 300 is controlled by user controls 303, such as a series of user buttons including a shutter release (e.g., capture button) (not shown) which initiates a picture taking operation. The graphical user interface displayed on the color LCD image display 332 is controlled by the user interface portion of the firmware stored in the firmware memory 328. The camera user interface can also include a digital-to-analog (D/A) converter and miniature speaker (not shown) which makes audible sounds when a new picture is taken, or when the user changes modes or advances to review the next stored image. The electronic camera 300 can also include a video output driver and connector (not shown) for displaying the captured images on a TV (not shown).

After a series of images have been taken and stored on the removable memory card 330, the removable memory card 330 can be inserted into a memory card reader (not shown) in the user's host computer 340, which may be the same as the computer 10 in FIG. 1. Alternatively, an interface cable 342 can be used to connect between the host interface 322 in the electronic camera 300 and the corresponding camera interface in the host computer 340. The interface cable 342 may conform to, for example, the well-know universal serial bus (USB) interface specification.

The electronic camera 300 can alternatively be a motion video camera that captures a series of image frames from the image sensor 314 as well as an audio signal from a microphone (not shown). The image processor 320 then processes and compresses the image frames and audio information using a suitable compression method (e.g., MPEG-4 compression) to provide movie files that are stored on the removable flash memory card 330 or different type of digital recording media, such as digital video tape.

As described earlier in connection with FIG. 2, either the removable memory card 330 or the host interface 322 can be used to upload the customized firmware from the manufacturing customization computer 52, when the electronic camera 300 is configured by the manufacturing customization computer 52 of FIG. 1.

FIG. 4 is a block diagram of an Advanced Photo System (APS) film camera 350, which is a second type of imaging device 80 that can be personalized by the product configuration system 50 depicted in FIG. 1. The APS film camera 350 includes a zoom lens 352 controlled by zoom and focus motors 354 and an adjustable aperture and shutter (not shown) for focusing light from a scene (not shown) onto APS film 380. The aperture size and shutter exposure time are controlled by a control processor 364, which also receives inputs from autofocus and autoexposure detectors 356 and controls a flash 358 to emit light when the ambient light level is low. A film transport unit 362 advances the frames of the APS film 380 under the control of the control processor 364. A magnetic writer unit 360 writes digital data to the film leader, and to each frame, of the APS film 380, under the control of the control processor 364. The control processor 364 executes firmware stored in firmware memory 370, which may be Flash EPROM memory, in response to user inputs from user controls 372. The control processor 364 also provides information to an LCD display 374, which can be a data display with one or more lines of alpha-numeric characters, or a monochrome or color raster image display. RAM memory 368 temporarily stores the data which is displayed on the LCD display 374. Film camera 350 can also include a digital-to-analog (D/A) converter and miniature speaker (not shown) which makes audible sounds when a new picture is taken, or when the user depresses various user controls 372.

A host interface 366 is used to upload the configured firmware from the manufacturing customization computer 52 via an interface cable 367, which can be, for example, an RS-232 serial cable, when the APS film camera 350 is configured by the product configuration system 54 of FIG. 1.

The configured firmware stored in the firmware memory 370 can include personal digital data, for example, the name, address, and a digital image of the customer's designee, or a greeting from the customer to the customer's designee. This personal digital data can be displayed on the LCD display 374 for a specified period (e.g., five seconds) when the APS film camera 350 is turned on. Alternatively, it can be displayed when the appropriate "camera owner information" mode is selected using the user controls 372 used in conjunction with the LCD display 374. This personal digital data can be used to determine the owner, in case the APS film camera 350 is lost or stolen.

The configured firmware stored in the firmware memory 370 can include messages appropriate for various images, such as "Happy Birthday, John", or "Another Picture of the Smith family." These messages are provided by the customer in block 110 of FIG. 2, and downloaded to configure the APS film camera 350 in block 120 of FIG. 2. The message can be selected by the camera user after taking a picture, and can be then recorded as ASCII text data on the magnetic tracks of the APS film 380. When the APS film 380 is developed and printed, the magnetic tracks of the APS film 380 are read to recover this ASCII text message. The text message can then be printed on the back of the print if the print is made by optically printing the APS film 380. Alternatively, the text message can be printed on a front corner of the print if the print is made by scanning and digitally printing the APS film 380.

FIG. 5 is a block diagram of a digital printer 400, which is a third type of imaging device 80 that can be configured by the manufacturing customization computer 52 depicted in FIG. 1. The digital printer 400 produces digital prints (not shown) from images provided on a removable memory card 430 or via a host interface 442 from a host computer 440. The digital printer 400 includes a media transport mechanism 410, such as a motor-driven roller, for moving hard copy media (e.g., ink jet paper) past a marking apparatus 412 (e.g., a color ink jet head) under the control of a processor 420. The processor 420 controls the marking apparatus 412 to provide controlled amounts of various color inks or dyes in order to produce a pictorial image on the hardcopy media.

Digital image files to be printed can be provided on a memory card 430 that interfaces to the processor 420 via a memory card interface 424. The memory card 430 can be adapted to the PCMCIA card interface specification, the CompactFlash specification, or similar specifications. If the image to be printed is supplied in a compressed image format (e.g., JPEG compression), the processor 420 decompresses the image. The processor 420 can also provide interpolation, color and tone correction, half-toning, sharpening, or other types of digital image processing to prepare the image data properly to be used by the marking apparatus 412.

The processor 420 is controlled by firmware stored in firmware memory 428. The digital printer 400 includes a display 432, which ca be a simple status display, or which can, alternatively, be a raster image display. If the display 432 is a status LCD, the user selects prints by picture number, or alternatively, by creating a print order file, using, for example, the "Digital Print Order Format" (DPOF) specification, when the pictures are stored on the memory card 430.

If the display 432 is a raster image display, the processor 420 downloads the "thumbnail" size images from the images provided on the memory card 430, which are stored in RAM memory 426 and supplied to the display 432, so that the user can select the images to be printed using user controls 430. The graphical user interface displayed on the display 432 is controlled by the user interface portion of the firmware stored in the firmware memory 428.

The printer 400 can also include a D/A converter and miniature speaker (not shown) which makes audible sounds when a print is finished and ready to be viewed, or when various user controls 430 are depressed. These sound files can be selected by the user in block 108 of FIG. 1, and stored in firmware memory 428. Instead of a raster image display, the printer can include a video output driver and connector (not shown) for displaying the selected images on a TV receiver (not shown).

Either the removable memory card 430 or the host interface 422 can be used to upload the customized firmware to the firmware memory 428 from the manufacturing customization computer 52 (shown in FIG. 1), as described earlier in connection with FIG. 2, when the digital printer 400 is configured by the product configuration system 50 of FIG. 1.

The configured firmware stored in the firmware memory 428 can include personal digital data, for example, the name, address, and a digital image of the customer's designee, or a greeting from the customer to the customer's designee. If the display 432 is a raster image display, this personal digital data can be displayed on the display 432 for a specified period (e.g., five seconds) when the digital printer 400 is turned on. Alternatively, if the display 432 is a status display incapable of displaying images, the personal digital data can be printed by the marking apparatus 412 onto the hardcopy media (not shown) when the "print camera owner information" mode is selected using the user controls 432 used in conjunction with the status display 432. Alternatively, this personal digital data can be printed as part of a test print mode included to test the operation of the digital printer 400. This personal digital data can be used to determine the owner, in case the digital printer 400, which can be a small portable device, is lost or stolen.

The configured firmware stored in the firmware memory 428 can include firmware that provides various other features, selected by the customer in block 110 of FIG. 2. These features can include:

Configuring the digital printer 400 to selectively modify the color images to produce different types of digital images before printing, in order to produce monochrome, sepia, false-color, or super saturated color prints;

Configuring the digital printer 400 to support various image file formats, such as JPEG, TIFF, and JPEG2000;

Configuring the digital printer 400 to provide the ability to modify captured images as they are processed, such as by digital zooming and cropping, tone or color adjustments, or sharpness adjustments;

Configuring the digital printer 400 to provide red-eye removal prior to printing images;

Configuring the digital printer 400 to provide the ability to select one or more border templates that can be combined with the images to be printed, as described in commonly-assigned U.S. Pat. No. 5,477,264 to Sarbadhikari et al.;

Configuring the digital printer 400 to provide support for printing the images defined in a print ordering file (for example, a DPOF file), as described in commonly-assigned U.S. patent application Ser. No. 08/977,382, filed Nov. 24, 1997 to Parulski, the disclosure of which is herein incorporated by reference; and Configuring the digital printer 400 to provide the ability to stitch multiple images together to produce panoramic images, such as by using the method described in commonly-assigned U.S. patent application Ser. No. 09/224,547, filed Dec. 31, 1998 to Parulski, the disclosure of which is herein incorporated by reference.

FIG. 6 is a block diagram of a digital image display device 500, which is a fourth type of imaging device 80 that can be personalized by the product configuration system 50 depicted in FIG. 1. The digital image display device 500 produces an image on a color image display 532, such as a color LCD, from images provided on a removable memory card 530 or via a host interface 542 from a host computer 540. If the image to be displayed is supplied in a compressed image format (e.g., JPEG compression), a processor 520 decompresses the image. The processor 520 can also provide decimation to produce an appropriately sized digital image for the color image display 532. The processor 520 can further provide color and tone correction, sharpening, or other types of digital image processing prior to displaying the image.

The processor 520 is controlled by firmware stored in firmware memory 528. The processor 520 creates appropriately sized images that are stored in RAM memory 526 and provided to the color image display 532. The user can select the images to be viewed using user controls 530. The graphical user interface displayed on the color image display 532 is controlled by the user interface portion of the firmware stored in the firmware memory 528. Instead of including a color image display as part of the digital image display device 500, the digital image display device 500 can include a video output driver and connector (not shown) for displaying the selected images on a TV receiver (not shown). The digital image display device 500 can also include a modem 544 for transmitting and receiving images.

Either the removable memory card 530 or the host interface 522 can be used to upload the customized firmware from the manufacturing customization computer 52, as described earlier in relation to FIG. 1, when the digital image display device 500 is configured by the product configuration system 54 of FIG. 1.

The configured firmware stored in the firmware memory 528 can include personal digital data, for example, the name, address, and a digital image of the customer's designee, or a greeting from the customer to the customer's designee. This personal digital data can be displayed on the color image display 532 for a specified period (e.g., five seconds) when the digital image display device 500 is turned on.

The configured firmware stored in the firmware memory 528 can also include firmware that provides various other features, selected by the customer in block 110 of FIG. 2. These features can include:

Configuring the digital image display device 500 to convert color images to different types of images before displaying the images, to provide monochrome, sepia, false-color, or super saturated color images;

Configuring the digital image display device 500 to support various image file formats for the images stored on memory card 530, such as JPEG, TIFF, and JPEG2000;

Configuring the digital image display device 500 to provide the ability to modify captured images as they are processed, such as by digital zooming and cropping, tone or color adjustments, or sharpness adjustments; and Configuring the digital image display device 500 to transmit or receive images from an electronic network, such as the Internet, using the modem 540, for example, as described in commonly-assigned U.S. patent application Ser. No. 09/004,046, filed Jan. 7, 1998 to Ward, the disclosure of which is herein incorporated by reference.

Figure 7A:
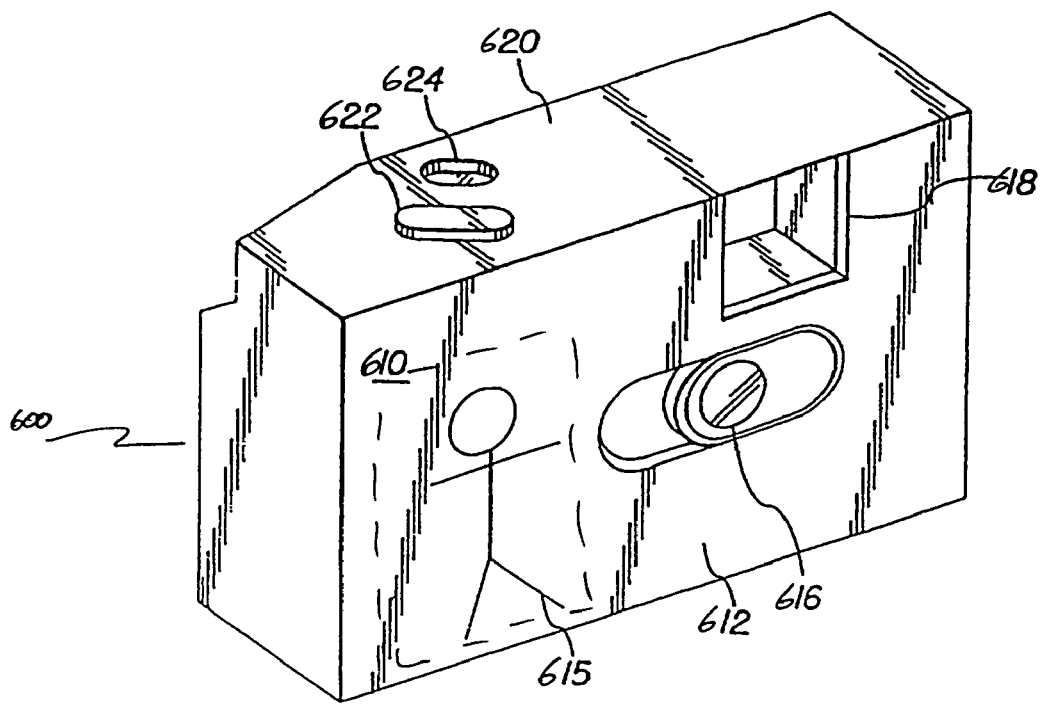
FIG. 7a depicts a front perspective view of a one-time use film camera that can be personalized as part of the purchase transaction.
Figure 7B:
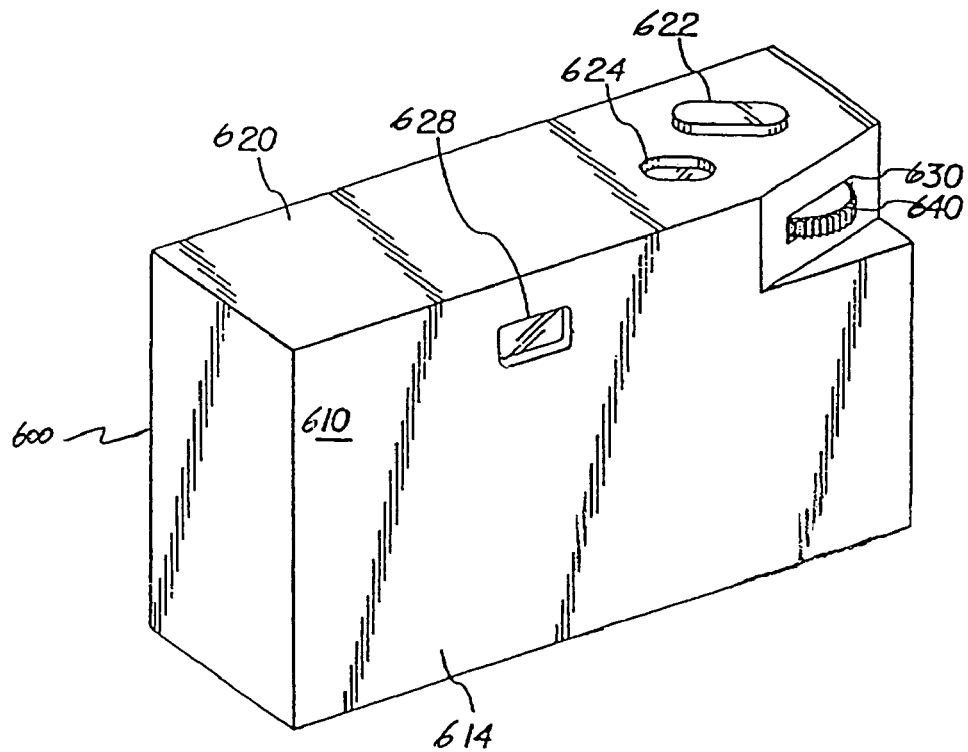

FIGS. 7A and 7B depict a photographic film product, which is a one-time use (OTU) film camera 600 preloaded with film that can be personalized as part of the purchase transaction. The camera body is formed of plastic and is encased in an exterior camera package 610, to which the custom product labels 60 can be attached, for example, at a position 615. The camera package 610 comprises a main front cover section 612, a back cover section 614, a top section 620 and side and bottom sections which surround a light-tight, box shaped, camera body. The main front cover section 612 is provided with apertures for exposing a taking lens 616 and a viewfinder window 618 of the enclosed camera body. The top section 620 has a pair of apertures for receiving a shutter release button 622 and for viewing an underlying exposure counter wheel number 624. An aperture for a viewfinder eyepiece 628 is provided in the back cover section 614 for the camera viewfinder window 618. A thumb wheel opening 630 permits a thumb wheel 640 to be exposed to be rotated by the user to advance the filmstrip to the next image frame to be exposed. A film package of this type is available from the Eastman Kodak Company as the Fun Saver 35 and in other similar configurations.

Figure 8:
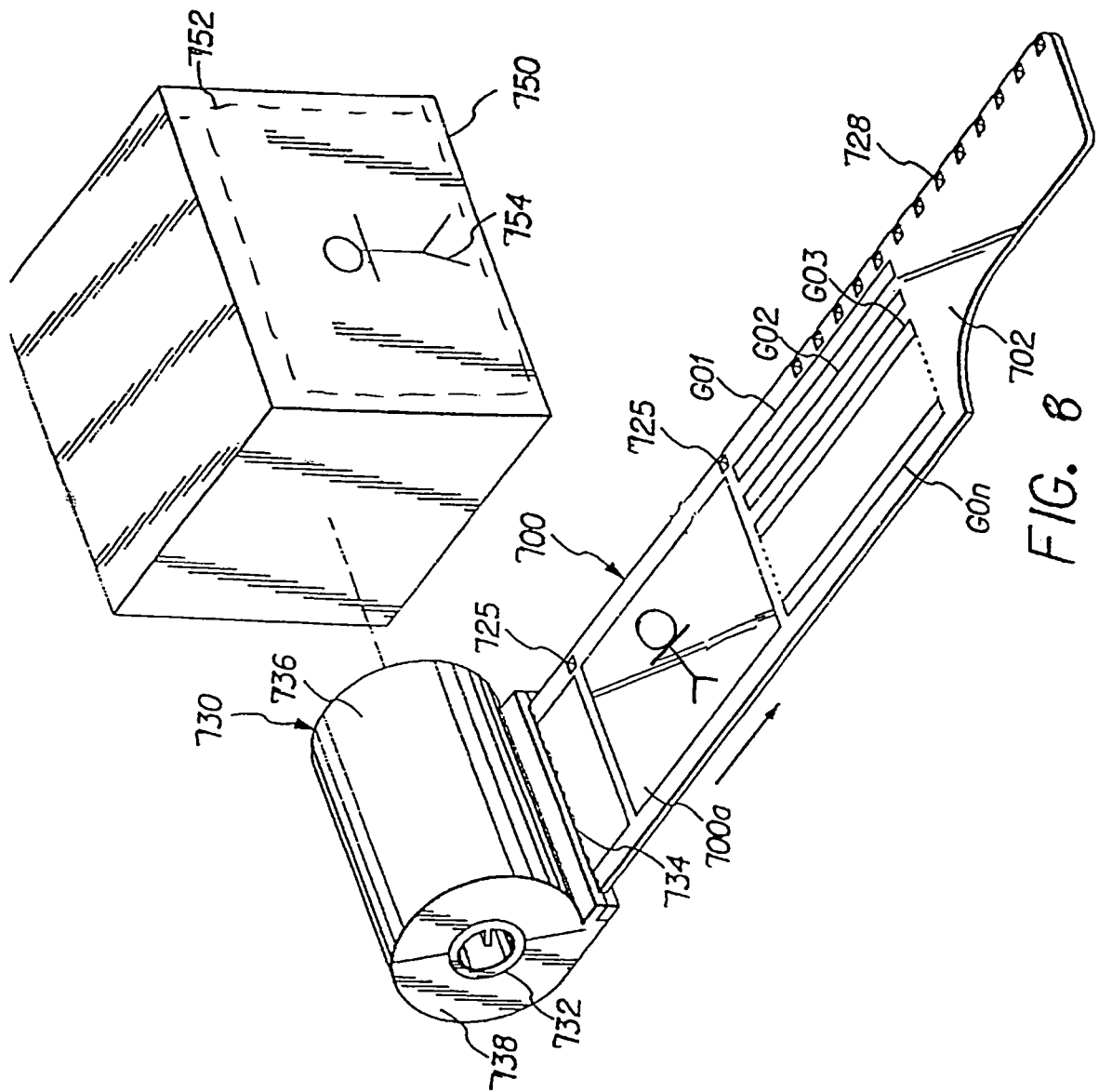
FIG. 8 depicts a pre-exposed image on the film used in the camera of FIG. 7 or sold as a separate film box.

FIG. 8 depicts a pre-exposed image on the film used in the OTU film camera 600 depicted in FIGS. 7A and 7B, or sold as a separate film box. A filmstrip leader 702 and a first image frame 700a of a filmstrip 700 are depicted withdrawn from a film cartridge door 734 of a film cartridge 730. The film cartridge 730 includes a cartridge shell 736 extending between end plates 738 and enclosing a hub 732 in a manner well known in the art. The film cartridge 730 is preferably of the thrust type having a light tight film cartridge door 734 that can be opened to advance the filmstrip 700 out of or back into the film cartridge 730. In this regard, the cartridge hub 732 can be engaged by a drive member (not shown) and rotated in both directions to assist in ejecting or retracting the filmstrip 700 out of and back into the open film cartridge door 734. The various embodiments of the invention can also be practiced with the standard film cartridges of the 35 mm type. The filmstrip leader 702 includes closely spaced perforations 728 for automatic film advance mechanisms used in cameras. The filmstrip 702 includes magnetic tracks G01-G0$n$ which, in accordance with an embodiment of the present invention, are recorded with data identifying specific services to be provided by a photofinisher. It will be understood that the track size, number of tracks, and placement on the filmstrip leader 702 depicted in FIG. 8 are arbitrary and not to scale. One or more image frames, such as frame 700a, are pre-exposed with latent images when the OTU film camera 600 is configured by the product configuration system 50 in FIG. 1. The latent images are produced from digital images supplied by the customer as part of block 910 in FIG. 10.

FIG. 8 also illustrates a further embodiment of the invention, wherein the filmstrip 700 and the cartridge 730 are intended to be used in a reloadable film camera, rather than in a one-time use camera. In this aspect, the filmstrip 700 can be wound into the cartridge 730 and placed in a film package 750 for shipping to retail dealers. In this embodiment, the arrangement including the filmstrip 700 incorporated into the cartridge 730, and the film package 750, is a photographic film product. The film package 750 can be, for example, a box, a canister, or any other suitable container, and can include the graphics, text and colors typically employed to identify the brand, manufacturer, film speed, and type of film in a manner well known in the art. It can also include one or more areas 752 to which the custom product labels 60 can be affixed. The custom product label 60 can include a digitally printed image supplied by the customer as part of block 110 in FIG. 2. The custom product label 60 can also include text indicating the specific services to be provided by the photofinisher.

Figure 7:
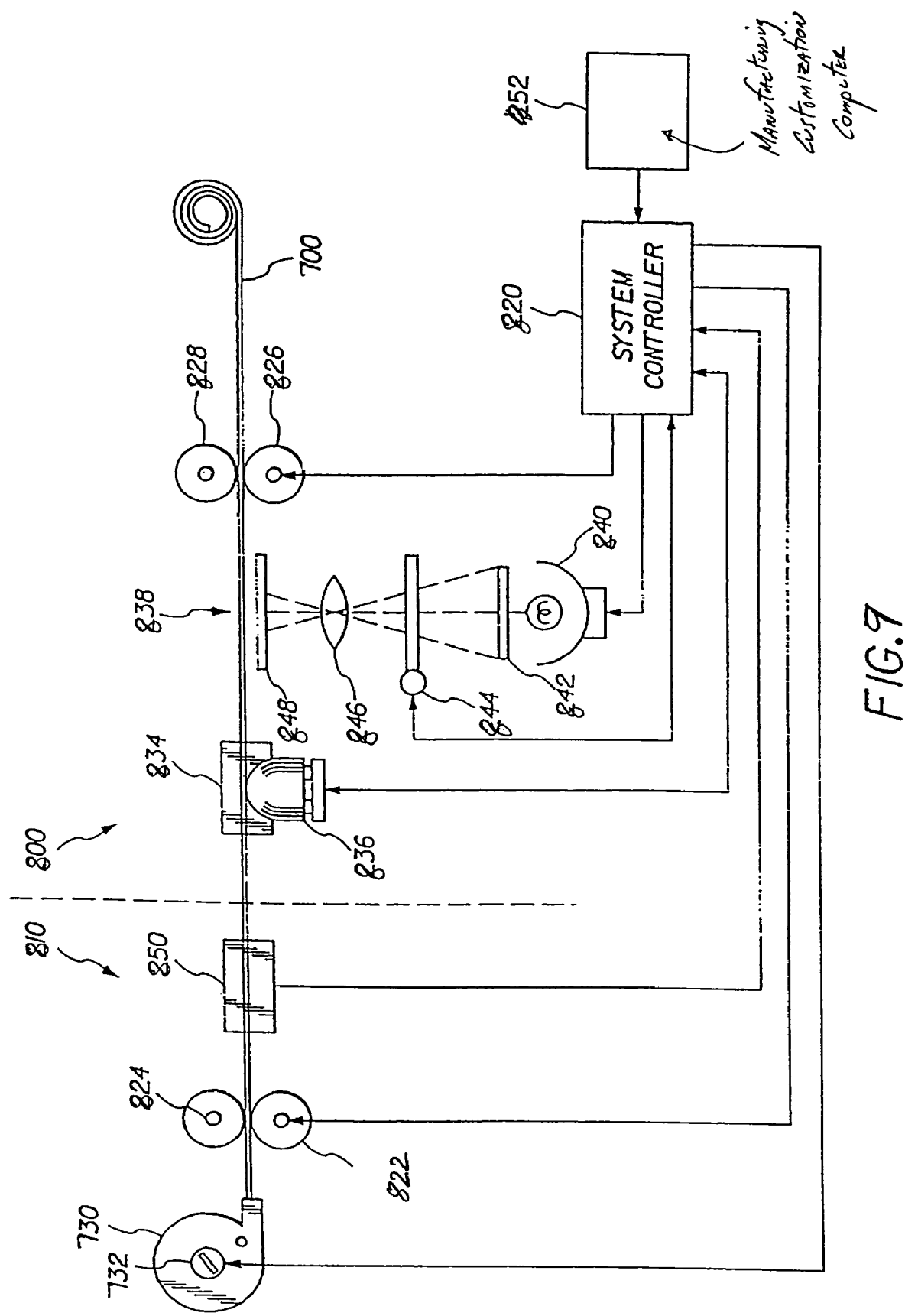

FIG. 9 is a block diagram of a system used to personalize the OTU film camera 700 depicted in FIG. 7. FIG. 9 includes a magnetic recording subsystem 810 for recording the data in the magnetic tracks $G01$-$G0n$, and a subsystem 800 for making latent image exposures on one or more of the image frames 700$a$, as part of the process of configuring the filmstrip 700 by the product configuration system 50 of FIG. 1. The system is controlled by a system controller 820 which is in turn controlled by the manufacturing customization computer 52. The filmstrip 700 is partly withdrawn from the cartridge 730 and advanced past a perforation sensor 850. Advancement is effected by commands from the system controller 820 applied to a mechanism for opening the film cartridge door 734 of the film cartridge 730 and rotating hub 732 to eject the filmstrip leader 702 and drive it between a first driven roller 822 and an idler roller 824. A drive roller motor (not shown) rotates the driven roller 822 and the idler motor 824 in a first direction in response to drive signals received from the system controller 820. The filmstrip leader 702 is then advanced between a backing support 834 and a magnetic read/write head 836, and magnetic recording in the tracks $G01$-$G0n$ is effected by signals applied to the magnetic recording read/write head 836 from the system controller 820. The lengths of the tracks $G01$-$G0n$ are controlled by signals received from a perforation sensor 850. The specific data recorded in magnetic recording tracks $G01$-$G0n$ is provided by the manufacturing customization computer 52. After the tracks are recorded, the first drive motor direction is reversed to drive the filmstrip 700 back into the cartridge 730, and the film cartridge door 734 is closed.

The subsystem 800 of FIG. 9 enables the digital images provided by the product configuration system 50 to be exposed on one or more image frames 700$a$. In order to do so, the filmstrip 700 is advanced in a dark enclosure out of the film cartridge door 734. Then, the filmstrip image frames are advanced an image frame at a time through a latent image exposure station 838 and between the second motor driven roller 826 and the idler roller 828 to present each image frame to be exposed into the exposure gate 848.

The latent image exposure can be produced using various methods. Some customers will purchase a large lot of OTU cameras 600 or packaged film rolls 750 that are to be produced having the same pre-exposed images. For example, several thousand single-use "Packer football" cameras, having a pre-exposed image of quarterback Brett Farve, could be ordered for sale at a Packer football game. In this case, a digital image of Brett Farve would be provided by the customer as personalized digital data as the lot of OTU cameras 600 is purchased. The manufacturing customization computer 52 could connect to a digital hardcopy printer, such as a Kodak XLS 8650 thermal dye sublimation printer (not shown), in order to produce a transparency 842 (in FIG. 9) of the Brett Farve image. The product label printer 58 is used to produce the custom product labels 60 which can include text, for example, "Packer Backer Camera," and a low resolution image of Brett Farve. The custom product labels 60 are affixed to the OTU camera 600 (at position 615), or the film package (at position 752).

The transparency 842 containing the transparency image to be pre-exposed on the film is illuminated by a light source 840, and the image is projected in focus on the area 700$a$ by an imaging lens 846 when a shutter 844 is opened. The filmstrip 700 is clamped in an exposure gate 848. The exposure is effected through the opening and closing of the shutter 844 which is operated by signals from the system controller 820. Different latent image exposures can be provided using multiple transparencies and a motorized transparency transport system (not shown). After one or more of the image frames 700$a$ are exposed in this fashion, the motor driven rollers 822 and 826, and the hub 732, are operated in the second direction to retract the filmstrip 700 back into the film cartridge 730. The film cartridge door 734 of the film cartridge 730 is then closed under control of the system controller 820. To prevent re-exposure of the pre-exposed frames, the film is then placed in the OTU camera 600 and the filmstrip 700 is advanced past the pre-exposed frames. When the film cartridge 730 is separately packaged in the film package 750, the magnetic tracks recorded with each film frame indicate which image frames have been pre-exposed, using well-known mid-roll interrupt methods, to prevent re-exposure of the pre-exposed frames.

Some customers will purchase relatively small lots of OTU cameras 600 or packaged film rolls 750. In this situation, instead of using the transparency 842 illuminated by the light source 840, the digital data can be provided directly to a high resolution digital film writer (not shown), such as a monochrome CRT, which focuses a high resolution image through a red, green, and blue color filter wheel and onto the filmstrip 700. Other types of digital film writers, including writers using LCDs and LEDs, can alternatively be used.

Figure 10:
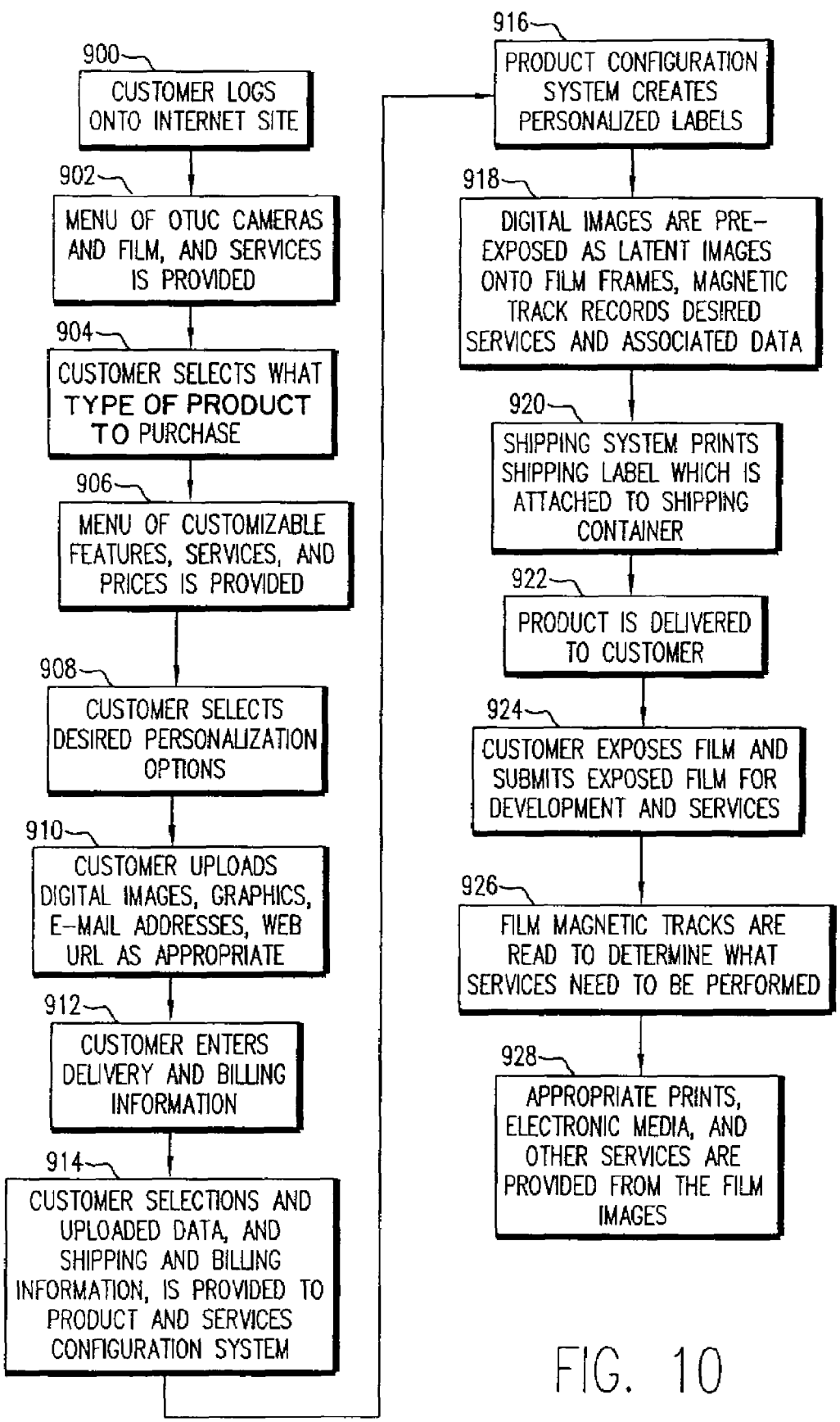
FIG. 10 is a flow diagram of a typical purchase transaction for providing the personalized one-time use cameras depicted in FIG. 7 using the apparatus depicted in FIG. 9.

FIG. 10 is a flow diagram of a typical purchase transaction for providing the personalized OTU cameras 600 depicted in FIG. 7 using the apparatus depicted in FIG. 9. As shown in block 900, the customer, using a digital communication network, logs onto the channel 36, which can be the Internet as described earlier in relation to block 100 of FIG. 2.

In block 902, the product provider provides the customer with a menu of cameras and film, such as OTU cameras 600 in FIG. 7 and the packaged film 750 in FIG. 8, that are available for customization. The menu can also include a list of services, such as:

Providing standard optical prints from the film images;

Providing a CD-R or floppy disk with the digitized film images;

Uploading the digitized film images to a web site provided by the product provider, or alternatively, a web site designated by the user; and E-mailing the images to one or more e-mail addresses provided by the user.

In block 904, the customer selects what type of product to purchase, and the desired quantity. At that point, in block 906, a menu of customizable features that can be selected, and corresponding prices, is presented to the customer. In block 908, the customer selects the desired features of the product they decide to purchase.

The features from which the customer can select may include:

Providing text, graphics, or digital images to create custom labels that are affixed to the OTU camera 600 in FIG. 7 or the film package 750 in FIG. 8;

Providing one or more digital images to be pre-exposed on the film contained within the OTU camera 600 in FIG. 7 or the film package 750 in FIG. 8;

Identifying, using magnetic tracks G0$n$ in FIG. 8 that the film images should be chemically developed and then optically printed, or digitally scanned and digitally printed to produce one or more service prints for each exposed film frame, having a size (e.g., 3.5"×5", 4"×6") and finish (e.g., glossy, matt) selected by the user;

Identifying, using magnetic tracks G0$n$ in FIG. 8 that the film images should be digitized and digitally processed to provide a modified image, such as monochrome, sepia, false-color, or super saturated color images, rather than normal color images;

Identifying, using magnetic tracks G0$n$ in FIG. 8 that the film images should be digitized and stored on a digital media selected by the user, such as a floppy disk or PictureCD;

Identifying, using magnetic tracks G0$n$ in FIG. 8, that the film images should be digitized and digitally processed to combine a border template with the film images, as described in commonly-assigned U.S. Pat. No. 5,758,216 to Arnold, the disclosure of which is herein incorporated by reference;

Identifying, using magnetic tracks G0$n$ in FIG. 8, that the film images should be digitized and the digital image files should be uploaded to the Internet to a prescribed Internet URL (Universal Resource Locator) provided by the customer, or to a service account provided by the product provider;

Identifying, using magnetic tracks G0$n$ in FIG. 8, that the film images should be digitized and the digital image files should be e-mailed to one or more e-mail addresses provided by the customer; and Identifying, using magnetic tracks G0$n$ in FIG. 8, personal digital data, such as the name, address, or copyright notice of the camera owner. This information can be printed on the front or back of prints produced from the exposed film.

Depending on the features selected, the customer uploads the necessary digital images, graphics, name, copyright notice, e-mail addresses, or web URLs (block 910). The personalization information can also include an identifier for one or more border templates that can be provided by the product provider. For example, the customer may be a bride ordering several dozen OTU cameras for a wedding. The bride can upload a digital image of the wedding couple, to be used to produce the custom product labels 60 along with a text message "John and Sue, Jan. 28, 2000". The bride can select two 4×6 digital prints of each image made, and also select a border template having a wedding motif from a selection of border templates displayed in block 906. The template can be further personalized by adding the same text message "John and Sue, Jan. 28, 2000", or a different message. The bride can also decide to have a digital image file produced from each film frame and uploaded to a web site provided by the service provider, which can later be viewed by all the wedding guests.

In block 912, the customer enters delivery and billing information. This information identifies the customer and the customer's designee, as described earlier in relation to block 112 of FIG. 2. In block 914, the electronic database 44 provides the product configuration center 50 with the customer's selected configuration, and the personalization information.

In block 916, the manufacturing customization computer 52 controls a product label printer 58 in order to produce the custom product labels 60. These custom product labels 60 are then attached, for example, by glue or another lamination process, to the OTU camera 600 in FIG. 7 or the film package 750 in FIG. 8. The custom product labels 60 are provided in the color scheme selected by the customer in block 910, and include any special messages, logos, or images provided by the customer.

In block 918, the digital images are pre-exposed as latent images onto the film frames 700, and the magnetic tracks G0$n$ of the film frames are recorded, as described earlier in relation to FIG. 9. The information recorded in the magnetic tracks identifies the services selected in block 908. For example, it identifies what quantity, size, and finish hard copy prints have been selected. It further identifies whether a template border file should be used, and if so, the identification number of the selected border and any text message that should be included in the border file. It further identifies whether the film images should be scanned and provided as digital files on a particular media, or uploaded to a web site or e-mailed to one or more addresses. In one embodiment of the present invention, all of this information is stored using the magnetic recording tracks G$n$. In another embodiment, only an identification number is stored using the magnetic recording tracks G$n$, or alternatively, using a bar code or other identification number on the OUT camera 600. This identification number is used to access a corresponding services file stored in the electronic database 44. When the filmstrip 700 is later developed, this identification number is read and used to access the appropriate services file to determine what services and customization options (e.g., border files) have been purchased by the customer.

In block 920, the shipping system 70, which communicates with the manufacturing customization computer 52, controls the shipping label printer 72 to produce the shipping label 74. The customized group of OUT cameras 600 or the packaged films 750 is placed in an appropriately sized shipping container (not shown), and the shipping label 74 is attached to the shipping container. In block 922, the shipping container is delivered to the customer or the customer's designee.

In block 924, the customers expose the film as in normal picture-taking, and submit the exposed film, or completely used OTU cameras 600, for development and services. This can be accomplished by mailing the film cartridges 730 or the OTU cameras 600 back to the product provider, or by taking the film cartridges 730 or OTU cameras 600 to a retail establishment associated with the product provider.

In block 926, the film magnetic tracks are read to determine the services that need to be provided. As described earlier in relation to block 918, this is done either by directly reading the services encoded as magnetically recorded information on the filmstrip 700, or alternatively, by reading the identification number recorded in the magnetic track or the bard code or ID number on the OUT camera 600 and using this identification number to access a corresponding services file stored in electronic database 44, to determine what services and customization options have been purchased by the customer. In block 928, the appropriate prints, electronic media, and other services purchased by the customer are provided from the developed film images.

FIG. 11 is a flow diagram of a typical lease transaction for providing personalized digital imaging products and services. In this embodiment, a customer leases a digital imaging device, such as the electronic camera 300. The lease can include, for example, a monthly fee for the use of both the electronic camera 300 and the use of services associated with the electronic camera 300. Alternatively, the lease can include payment for services associated with the electronic camera 300 on an as-used basis.

As shown in block 150, the customer, using a digital communication network, logs onto the channel 36 which can be the Internet, as described earlier in relation to block 100 of FIG. 2.

In block 152, the service provider provides the customer with a menu of imaging devices 80 that are available for lease, such as the electronic camera 300 depicted in FIG. 3, the APS film camera 350 depicted in FIG. 4, the digital printer 400 depicted in FIG. 5, and the digital image display device 500 depicted in FIG. 6. The menu can also include a list of services that can be provided.

In block 154, the customer selects a desired type of imaging device 80 to lease, for example, the electronic camera 300. At that point, in block 156, a menu of customizable features and services that can be selected, and corresponding prices, is presented to the customer. In block 158, the customer selects the personalization options for both the electronic camera 300, as well as the services that can be performed on digital images from the electronic camera 300.

The camera features from which the customer can select include those described earlier in relation to block 108 of FIG. 2. The services that can be provided include:

Digitally printing images produced by the camera to produce one or more service prints for each exposed film frame, having a size (e.g., 3.5"×5", 4"×6") and finish (e.g., glossy, matt) selected by the customer, as well as an optional border template file or back printed information selected by the customer;

Storing the digital images produced by the camera on a digital media selected by the customer, such as a PictureCD;

The service provider storing, and maintaining for a user selected period of time (e.g., 30 days, 1 year, or 10 years), the digital images produced by the camera on an Internet accessible digital storage device, such as on a hard drive connected to an Internet server; and E-mailing the digital images to one or more e-mail addresses provided by the customer.

Depending on the features selected, the customer provides appropriate personalization information that will later be incorporated into the configured electronic camera 300 (block 160) as described earlier in relation to block 110 of FIG. 2, as well as personalization information for the selected services, such as the ID of the selected template file.

In block 162, the customer enters delivery and billing information, as described earlier in relation to block 112 of FIG. 2. In block 164, the electronic database 44 provides the product configuration center 50 with the customer's selected configuration and personalization information for the selected imaging device 80 and the selected services.

In block 168, the manufacturing customization computer 52 shown in FIG. 1 selects the particular software programs required to provide the features selected by the customer for the customer's selected imaging device 80, as described earlier in relation to block 118 of FIG. 2. The manufacturing customization computer 52 also controls the product label printer 58 in order to produce the custom product labels 60.

In block 170, the manufacturing customization computer 52 downloads the configured firmware to the imaging device 80 in order to provide a configured imaging device, such as a configured electronic camera 300.

In block 172, the shipping system 70, which communicates with manufacturing customization computer 52, controls the shipping label printer 72 to produce the shipping label 74. The configured electronic camera 300 or other imaging device 80 is placed in a shipping container (not shown), and the shipping label 74 is attached to the shipping container. In block 174, the configured electronic camera 300 or other imaging device 80 is delivered to the customer or the customer's designee.

In block 176, a service user account is established for the customer, which defines the services to be provided to the customer. This service account information can be provided as part of electronic database 44, or as a separate digital database. These services can be provided for digital images uploaded by the customer to the service provider via the channel 36, such as the Internet. Alternatively, they could be provided by taking the removable memory 330 from the electronic camera 300 to a retail establishment associated with the service provider, and providing an appropriate service identifier, such as a service identification number. This service identification number can be stored in the firmware memory 328 of the electronic camera 300 by the manufacturing customization computer 52 when the electronic camera 300 is configured. The service identification number can then be stored onto the removable flash memory 330, either as part of each image file, or as a separate digital record, so that it can be used to automatically access the service account for the user to determine what services should be provided. When desired, the customer can modify the service user account to add additional services and to modify the lease agreement to include the additional services and to provide payment for such services.

A computer program product, such as a readable storage medium, can store the programs in accordance with the present invention for operating the methods set forth above. The readable storage medium can be a magnetic storage media, such as a magnetic disk (such as a floppy disk) or magnetic tape; optical storage media, such as an optical disk, an optical tape, or a machine readable bar code; solid state electronic storage devices, such as a random access memory (RAM) or a read only memory (ROM); or any other physical device or medium employed to store computer programs.

The invention has been described in detail with particular reference to certain preferred embodiments thereof, but it will be understood that variations and modifications can be effected within the spirit and scope of the invention.

PARTS LIST 10 computer
12 CPU motherboard
14 display monitor
16 keyboard
18 mouse
20 hard drive
22 dial-in modem
24 color scanner
30 Internet service provider equipment
32 modem
34 computers/routers
36 channel
40 product customization center
42 Internet server
44 electronic database
46 billing system
50 product configuration system
52 manufacturing customization computer
54 product firmware database
58 product label printer
60 custom label
70 shipping system
72 shipping label printer
74 shipping label 80 customized imaging device
300 electronic camera
302 flash
303 user controls
304 control processor and timing generator circuit
306 clock driver
308 autofocus and autoexposure detectors
310 zoom and focus motor drives
312 zoom lens
314 image sensor
316 analog signal processing and analog-to-digital converter circuit
318 DRAM buffer memory
320 image processor
322 host interface
324 memory card interface
326 RAM memory
328 firmware memory
330 flash memory card
332 image display
340 host computer
342 interface cable
350 film camera
352 zoom lens
354 zoom and focus motors
356 autofocus and autoexposure detectors
358 flash
360 magnetic writer unit
362 film transport unit
364 control processor
366 host interface
367 interface cable
368 RAM memory
370 firmware memory
372 user controls
374 LCD display
380 APS film
400 digital printer
410 media transport mechanism
412 marking apparatus
420 processor
424 memory card interface
426 RAM memory
428 firmware memory
430 removable memory card
432 display
440 host computer
442 host interface
500 digital image display device
520 processor
526 RAM memory
528 firmware memory
530 removable memory card
532 color image display
540 host computer
542 host interface
544 modem
600 one-time use film camera
610 exterior camera package
612 main front cover section
614 back cover section
615 position
616 taking lens
618 viewfinder window
620 top section
622 shutter release button
624 exposure counter wheel number
628 viewfinder eyepiece
630 thumb wheel opening
640 thumb wheel
700 filmstrip
700a first image frame
702 filmstrip leader
728 perforation
730 film cartridge
732 hub
734 film cartridge door
736 cartridge shell
738 end plates
750 film package
752 area
800 subsystem
810 magnetic recording subsystem
820 system controller
822 motor driven roller
824 idler roller
826 motor driven roller
828 idler roller
832 hub
834 backing support
836 magnetic read/write head
840 light source
842 transparency
844 shutter
846 imaging lens
848 exposure gate
850 perforation sensor

What is claimed is:

1. A method for a customer leasing a configured camera system including a camera and services for using such configured camera system and paying for the lease of such configured camera system, comprising the steps of:

(a) providing an electronic database of information describing a plurality of differently configured camera systems which have different features and services that can be selected by the customer via a digital communications network;

(b) displaying at the customer's location remote from the electronic database various components of the camera system that can be combined into the configured camera system;

(c) the customer selecting desired components and services to provide the configured camera system and completing a lease agreement and providing a payment identifier specifying an account to be debited to pay for the configured camera system; and (d) sending the camera to a designee of the customer and establishing a service user account that specify the selected services that the designee can use with respect to the images captured by said camera.

2. A method for a customer leasing a camera system including a camera and services for using such camera system and paying for the lease of such camera system, comprising the steps of:

(a) providing an electronic database of information describing at least one camera system which has services that can be selected by the customer via a digital communications network with respect to images captured by said camera;

(b) displaying at the customer's location remote from the electronic database the various services of the at least one camera system that can be selected by the customer;

(c) the customer selecting desired services and completing a lease agreement and providing a payment identifier specifying an account to be debited to pay for the selected services;
(d) establishing a service user account that specifies the selected services that the designee can use;
(e) storing in the camera, a service identifier corresponding to the service user account; and
(f) sending the camera to a designee of the customer.

3. The method of claim 2 wherein the camera includes firmware memory, and wherein the service identifier is stored in the firmware memory.

4. The method of claim 2 further including the step of:
(g) capturing an image using the camera; and
(h) forwarding such image to a service provider.

5. The method of claim 4 wherein the customer selected services include the service provider storing the image on a digital media selected by the customer, and shipping the digital media to a designee of the customer.

6. The method of claim 5 wherein the digital media is a CD-R.

7. The method of claim 4 wherein the customer selected services include the service provider storing the image on an Internet accessible digital storage device.

8. The method of claim 4 wherein the customer selected services include the service provider e-mailing the image to at least one e-mail address provided by the customer.

\* \* \* \* \*

UNITED STATES PATENT AND TRADEMARK OFFICE
CERTIFICATE OF CORRECTION

PATENT NO. : 7,587,337 B1 Page 1 of 1
APPLICATION NO. : 09/534471
DATED : September 8, 2009
INVENTOR(S) : Kenneth A. Parulski It is certified that error appears in the above-identified patent and that said Letters Patent is hereby corrected as shown below:

Title Page, Col. 1, (Title)       After "LEASING" insert -- A --.

Title Page, Col. 1, (Assignee)    Delete "NJ" and insert -- NY --, therefor.

Column 1, line 1, (Title)         After "LEASING" insert -- A --.

Signed and Sealed this

Fifth Day of January, 2010

David J. Kappos
*Director of the United States Patent and Trademark Office*